Apr. 24, 1923. 1,452,698
A. E. OSBORN
MOTOR VEHICLE
Filed Sept. 18, 1920
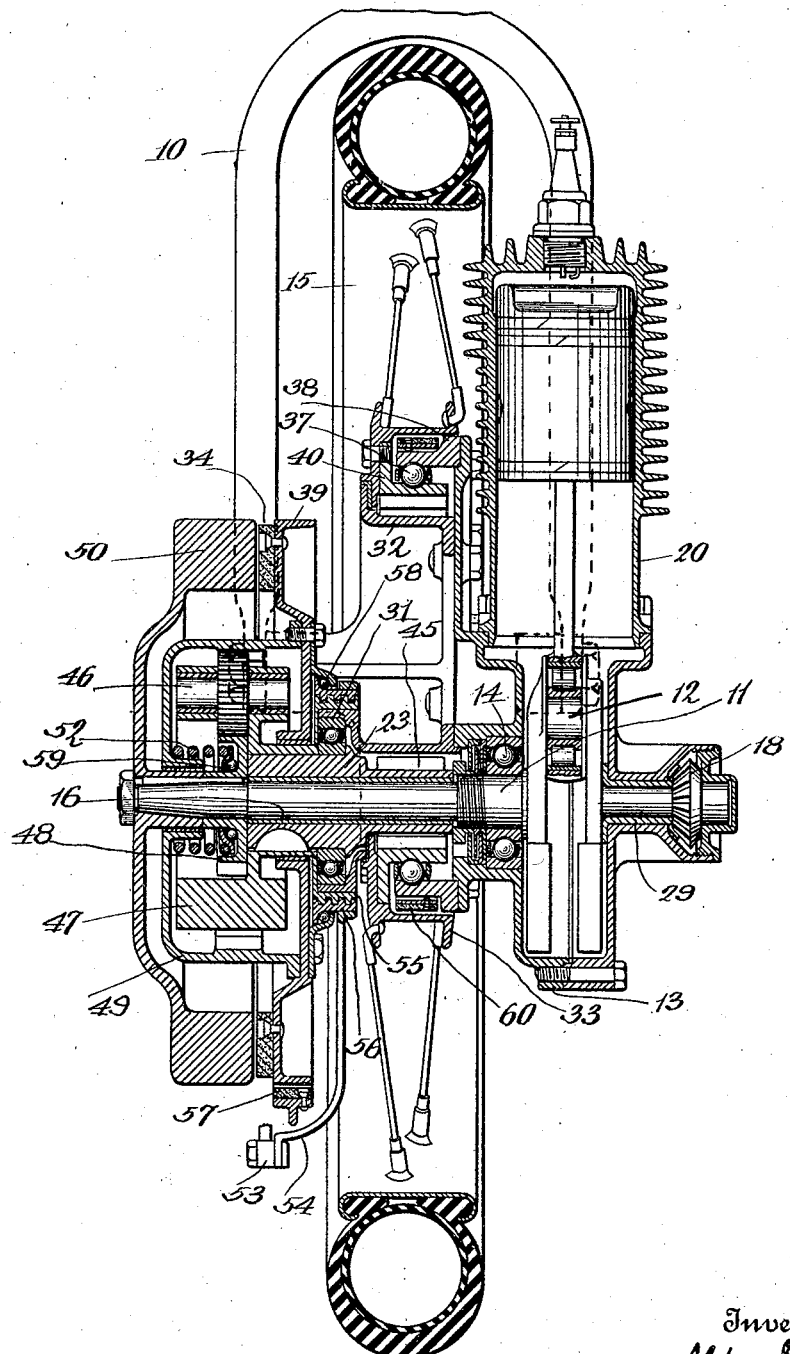
Inventor
Alden E. Osborn Patented Apr. 24, 1923.

1,452,698

UNITED STATES PATENT OFFICE.

ALDEN E. OSBORN, OF NEW YORK, N. Y.

MOTOR VEHICLE.

Application filed September 18, 1920. Serial No. 411,347.

*To all whom it may concern:*

Be it known that I, ALDEN E. OSBORN, a citizen of the United States of America, and a resident of New York, county of the Bronx, and State of New York, have invented certain new and useful Improvements in a Motor Vehicle, of which the following is a specification.

This invention relates particularly to a type of vehicle similar to that shown and described in my patent for a motor vehicle, No. 1,421,545, filed September 1st, 1920 and issued July 4, 1922, in which the main driving shaft of the propelling motor, or a shaft connected therewith, is concentric with the traction wheel and passes thru the axle of said wheel. It embodies certain modifications and improvements in the mechanism disclosed in that application particularly in that the motion of the main driving shaft is transmitted to the traction wheel in a more direct manner. It is, like the device of my above referred to patent, especially fitted for use in connection with motorcycles or tricycles having a single driving wheel either in the front or rear altho it is not necessarily limited in its use to such vehicles.

In the accompanying drawing I have, for the purposes of disclosure, illustrated my invention in one form only but I would have it understood that it is susceptible of embodiment in other forms without departure from the true spirit and scope of the invention as defined in the appended claims.

The accompanying drawing represents a sectional elevation of the traction wheel driving mechanism of my present invention taken parallel with the axis of the wheel hub.

In the drawing 10 represents the main frame of the motorcycle or vehicle which is detachably fastened to the power unit at each side of the traction wheel 15. At one side of the wheel is mounted the propelling engine 20 while at the opposite side of the wheel the fly-wheel 50 and clutch and speed change gear are arranged. The engine is shown as of the single cylinder two-cycle type altho a four-cycle engine as provided in my aforementioned Patent No. 1,421,545, or a multiple cylinder engine may be used. The crank shaft of the engine is shown, as in this patent, as made in two parts one of which 11 carries the wrist pin 12 and is mounted in a bearing 14 in the crank case 13 and a bearing 16 in the sleeve 23 and the other of which is a sliding fit on the wrist pin 12, or a nut thereon, and is mounted in a bearing 29 in the crank case 13. The shaft can, of course, be made in one piece with both the bearings 14 and 29 arranged to support the crank pin if desired. The small end of the shaft is shown as carrying the bevel gear 18 which drives a shaft arranged substantially at a right angle to the crank shaft and adapted to drive the magneto, operate the valves (if they are in the engine) and transmit motion to the engine from the starter pedal as described in my application Serial No. 491,960½, filed Aug. 13, 1921, and allowed Nov. 8, 1922. The sleeve 23 in which the shaft 11 turns is mounted in turn in a bearing 31 in the casing 32 which encloses the main driving gearing and is, as shown by the dotted lines, fastened to the crank case 13 at one side of the wheel and to the frame 10 at the other side, the crank case being connected to the other frame member on its side of the wheel so that it forms, with the casing, 32, the complete axle passing thru the wheel hub between the frame members. It is obvious that the casing 32 may be connected to the frame at both sides of the wheel and the engine crank case 13 attached thereto independently of the frame thus making the casing alone form the axle should such a modification be desired. The wheel 15 is shown as carried by a single row ball bearing 37—the outer ring 38 of which is fastened to the crank case 13 while the inner ring is formed by the driven gear 40 and is fastened to the wheel hub 33. The driven gear 40 meshes with the pinion 45 formed on the sleeve 23 which sleeve can be driven by the engine shaft 11 by means of a suitable speed change gear and friction clutch on the opposite side of the wheel from the engine. This speed change gear may be of any desired type but is shown, however, as of a planetary form and is contained within the fly wheel 50 attached to the end of the shaft 11. It comprises a driving gear 48 fastened to the shaft 11, a planetary pinion 46 rotatably mounted on carrier 47 fastened to the sleeve 23 and an internal gear 49 attached to the brake drum 39 and forming with the drum a casing for the planetary gear system. This drum 39 is also provided with a friction surface 34 which can be brought into contact with the face of the flywheel 50 so that the parts of the planetary gear can be restrained from relative motion and the sleeve 23 carried around with the shaft 11 at the same speed as the shaft. As this direct drive would be the speed most used when the device was in operation I have provided a spring 52 acting on the internal gear 49 and on the thrust bearing 59 to normally push the member 49 outward and draw the friction surfaces into contact. In order to, however, release this clutch when desired and bring the parts into the position shown I have arranged a second thrust bearing 58, an internally threaded collar 56 and an externally threaded sleeve 55 (fastened to the casing 32) in such a way that by rotating the collar 56 the thrust bearing 58 would act to draw the drum 39 away from the flywheel 50 against the action of the spring 52. The thread on the collar 56 and sleeve 55 should obviously have a very quick pitch in fact several threads would be used or if preferred cam teeth could be employed. When the parts are in the position shown and the friction clutch released the sleeve 23 can be rotated at a lower speed than the shaft 11 by restraining the rotation of the drum 39 which can be accomplished by means of a suitable brake shoe or band 57 acting on the drum. In order to operate the collar 56 I have provided a lever 54 to which is coupled the rod 53 which is connected to a handle or pedal within reach of the driver. I have also provided a suitable brake shoe or band 60 within the wheel hub 33 adapted to be expanded by a suitable lever arrangement (not shown) against the interior of the hub to stop the vehicle.

It should be clearly understood that while I have described and illustrated my invention in connection with an internal combustion engine only it is in no way limited to use with that type of prime mover but may be used with any other type, suitable modifications being made to meet the different requirements. It should also be understood that the use of a single bearing for supporting the traction wheel is not essential but that the more customary arrangement of two bearings can be employed if desired and that suitable adjustments can be provided to take up wear altho no adjustment is provided for the bearing shown in the drawing.

Having thus described my invention, I claim as new and desire to secure by Letters Patent—

1. In a motor vehicle the combination of a traction wheel, a propelling motor, a main shaft having connection with said motor at one side of said wheel and passing thru said wheel, a friction clutch on the opposite side of said wheel from said motor connection and having connection with said shaft, a driven member of said clutch rotatably mounted on said shaft, and a gear on said driven member and a coacting gear on said wheel meshing directly with the first named gear.

2. In a motor vehicle the combination of a traction wheel, a propelling motor, a main shaft having connection with said motor and passing thru said wheel, a gear rotatably mounted on said main shaft, a coacting gear carried by said traction wheel and meshing directly with the first named gear, and controllable means for transmitting motion between said main shaft and said first named gear to positively drive said gear at the same speed as the said main shaft rotates or at a different speed therefrom.

3. In a motor vehicle the combination of a traction wheel, a propelling motor, a main shaft having connection with said motor and eccentric to the axis of rotation of said traction wheel, a gear rotatably mounted on said main shaft, a coacting gear carried by said traction wheel and meshing directly with the first named gear, and controllable means for transmitting motion between said main shaft and said first named gear or for allowing said main shaft to rotate independently of said gear.

4. In a motor vehicle the combination of a traction wheel, a propelling motor, a main shaft having connection with said motor at one side of said wheel and passing thru said wheel, a flywheel on the opposite side of said traction wheel from said motor connection and having connection with said shaft, a gear on said main shaft between said motor connection to the shaft and the flywheel, and a coacting gear carried by said traction wheel and meshing directly with the first named gear.

5. In a motor vehicle the combination of a traction wheel, a hub for said wheel, a supporting member passing thru said hub and carrying a bearing for said hub, a propelling motor, a main shaft having connection with said motor at one side of said hub bearing and passing thru said bearing, a friction clutch attached to said shaft on the opposite side of said hub bearing from the said motor connection to the main shaft, a driven member of said clutch rotatably mounted on said main shaft, a gear on said driven member, and a coacting gear carried by said traction wheel hub and meshing directly with the first named gear.

6. In a motor vehicle the combination of a traction wheel, a hub for said wheel, a supporting member for said hub, a propelling motor, a main shaft having connection with said motor, a pinion gear on said main shaft, a coacting internal gear carried by said wheel hub and meshing directly with said pinion gear on said main shaft, and an anti-friction bearing surrounding said internal gear and between said internal gear and the said supporting member.

7. In a motor vehicle the combination of a frame, a traction wheel, a hub for said wheel, a supporting member passing thru said hub, connections between said frame and said supporting member at both sides of the wheel, a propelling motor, a main shaft having connection with said motor, a pinion gear on said main shaft, a coacting internal gear carried by said wheel hub and meshing with said pinion gear on said main shaft, and an anti-friction bearing surrounding said internal gear and between said internal gear and the said supporting member.

8. In a motor vehicle the combination of a main shaft, a driven member rotatably mounted on said shaft, a driving gear fastened to said shaft, a pinion rotatably carried by said driven member and meshing with said driving gear, and a third gear meshing with said pinion and rotatably mounted upon said main shaft and driven member, and longitudinally slidable thereon, a frictional driving surface attached to said third gear, a coacting frictional driving surface attached to the main shaft, a spring acting on said third gear to normally move said gear longitudinally along said shaft to bring the frictional driving surface attached thereto into contact with the said frictional surface on the main shaft, controllable means for longitudinally moving said third gear in opposition to said spring to draw said frictional surfaces out of engagement, and controllable means for restraining the rotation of said third gear.

9. In a motor vehicle the combination of a traction wheel, a propelling motor, a main shaft having connection with said motor and passing thru said wheel, a gear rotatably mounted on said main shaft, a coacting gear carried by said traction wheel and meshing directly with the first named gear, controllable means for transmitting motion between said main shaft and said first named gear or for allowing said main shaft to rotate independently of said gear, and a bearing for supporting said main shaft on the opposite side of the said gearing from the connection between the said propelling motor and the shaft.

10. In a motor vehicle the combination of a traction wheel, a propelling motor, a main shaft having connection with said motor and passing thru said wheel, a gear rotatably mounted on said main shaft, a coacting gear carried by said traction wheel and meshing directly with the first named gear, controllable means for transmitting motion between said main shaft and said first named gear or for allowing said main shaft to rotate independently of said gear, and a bearing for supporting said main shaft on the opposite side of the said gearing from the connection between the said propelling motor and the shaft and between the said gearing and the controllable means for transmitting motion between said main shaft and said first named gear.

11. In a motor vehicle the combination of a traction wheel, a hub for said wheel, a supporting member passing thru said hub and carrying a bearing for said hub, a propelling motor, a main shaft having connection with said motor, and also passing thru said hub, a friction clutch attached to said main shaft, a driven member of said clutch rotatably mounted on said shaft between the clutch attachment and motor connection thereto, a gear on said driven member, a coacting gear carried by said wheel hub and meshing directly with said first named gear, and a bearing for supporting said main shaft on the other side of the said gearing from the motor connection thereto and carried by said supporting member.

12. In a motor vehicle the combination of a traction wheel, a hub for said wheel, a supporting member passing thru said hub and carrying a bearing for said hub, a propelling motor, a main shaft having connection with said motor and also passing thru said hub, a friction clutch attached to said main shaft, a driven member of said clutch rotatably mounted on said shaft between the clutch attachment and motor connection thereto, a gear on said driven member, a coacting gear carried by said wheel hub and meshing directly with said first named gear, and a bearing for supporting said main shaft between said driven member gear and said clutch and surrounding said driven member and carried by said supporting member.

13. In a motor vehicle the combination of a traction wheel, a hub for said wheel, a supporting member passing thru said hub and carrying a bearing for said hub, a propelling motor, a main shaft having connection with said motor and also passing thru said hub, a friction clutch attached to said main shaft, a driven member of said clutch rotatably mounted on said shaft between the clutch attachment and motor connection thereto, a gear on said driven member, a coacting gear carried by said wheel hub and meshing directly with said first named gear, and means for controlling the action of said clutch between said clutch and said gearing.

14. In a motor vehicle the combination of a traction wheel, a hub for said wheel, a supporting member passing thru said hub and carrying a bearing for said hub, a propelling motor, a main shaft having connection with said motor and also passing thru said hub, a friction clutch attached to said main shaft, a driven member of said clutch rotatably mounted on said shaft between the clutch attachment and motor connection thereto, a gear on said driven member, a co-acting gear carried by said wheel hub and meshing directly with said first named gear, and a fly-wheel also attached to said shaft beyond the said clutch and with said clutch between it and the said gearing.

In witness whereof, I have hereunto set my hand this 14th day of September, 1920.

ALDEN E. OSBORN.